United States Patent

[11] 3,580,049

[72] Inventors Lonnie D. Cardwell
 Irving;
 Fred T. Esenwein; Arthur E. Pierard,
 Arlington, Tex.
[21] Appl. No. 750,426
[22] Filed July 25, 1968
[45] Patented May 25, 1971
[73] Assignee The United States of America as represented by the Secretary of the Navy

[54] ROCKET BURN RATE TESTING DEVICE
 1 Claim, 4 Drawing Figs.
[52] U.S. Cl. ................................................. 73/35,
 73/167
[51] Int. Cl. .................................................. G01n 33/22
[50] Field of Search .......................................... 73/35, 167

[56] References Cited
 UNITED STATES PATENTS
 3,201,973 8/1965 Fitzgerald et al. ............ 73/35
 3,267,721 8/1966 Jacobs et al. ................. 73/35

OTHER REFERENCES

Spenadel, L. BURNING RATE MEASUREMENT OF SOLID PROPELLANTS in The Review of Scientific Instruments, Vol. 32, No. 7, pp. 837—839, July, 1961 (copy in Group 280, 73-35).

Osborn, J. R. et al. TECHNIQUE FOR MEASURING BURNING RATES OF SOLID PROPELLANTS in The Review of Scientific Instruments, Vol. 35, No. 9, pp. 1130—1134, Sept. 1964 (copy in Group 280, 73-35).

*Primary Examiner*—Verlin R. Pendegrass
*Attorneys*—Raymond I. Tompkins, John W. Pease and John F. Miller

ABSTRACT: A closed chamber designed to hold one or more strands of a solid propellant is equipped with igniting means, pressure indicating means, and burning rate indicating means. The apparatus avoids the problems inherent in static burning rate tests using an inert pressurizing gas.

Patented May 25, 1971
3,580,049
2 Sheets-Sheet 1
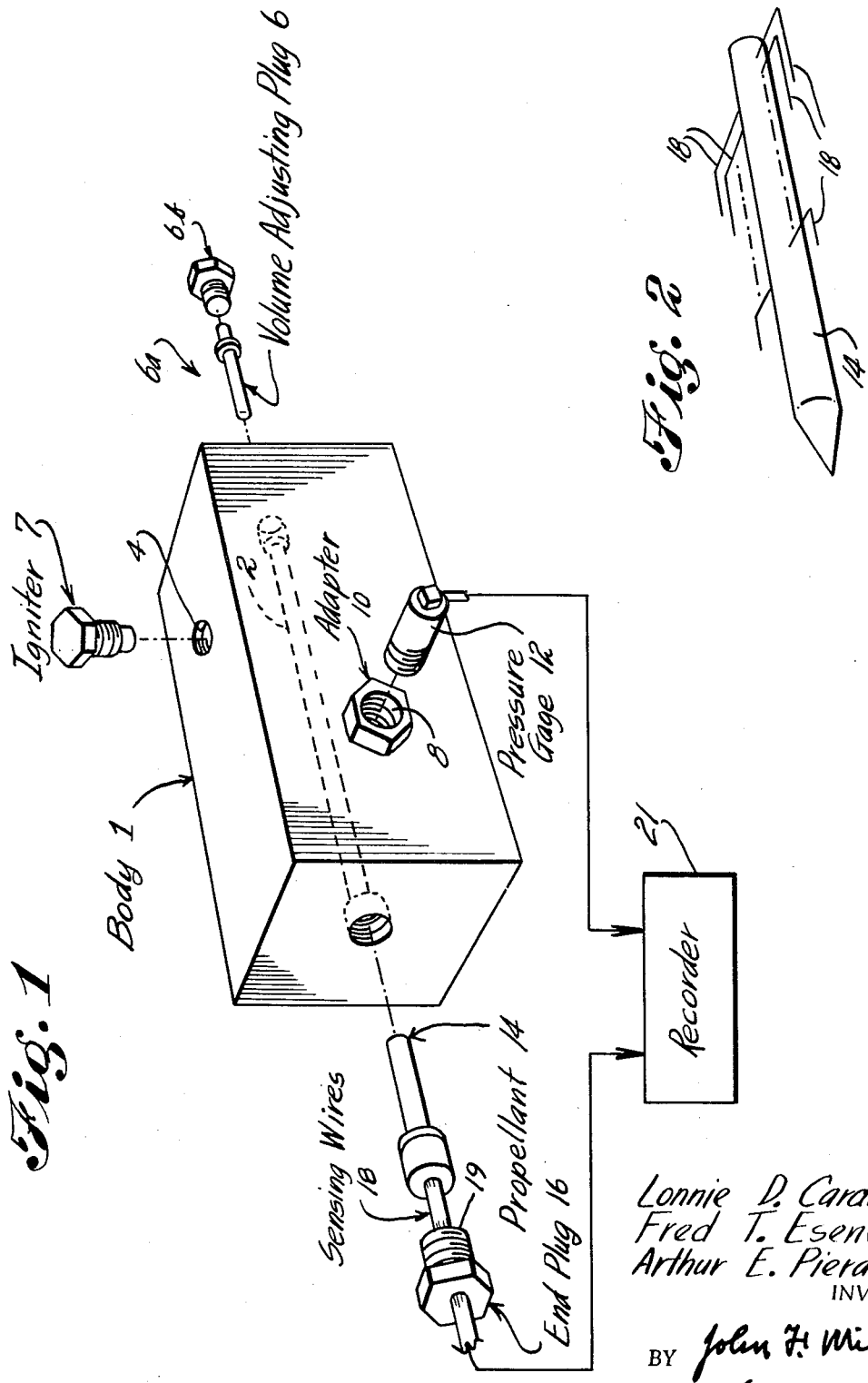
Lonnie D. Cardwell
Fred T. Esenwein
Arthur E. Pierard
INVENTOR.
BY John H. Miller
Agent
Attorney Patented May 25, 1971

Lonnie D. Cardwell
Fred T. Esenwein
Arthur E. Pierard
INVENTOR.

BY John H. Miller
John M. Agent
Attorney

ROCKET BURN RATE TESTING DEVICE

BACKGROUND OF THE INVENTION

The invention is in the field of measuring and testing devices. In the past various problems have been encountered in making conventional static tests of burning rates at high pressures of solid propellants. For example, when an inert gas is used for pressurizing, this adds on additional parameter since the gas itself may affect burning rates, temperature, etc.

This invention solves many of the problems of prior art burning rate measuring devices by using the gasses of combustion for pressurizing and determining the time required to burn predetermined lengths of propellant under controlled conditions.

SUMMARY OF THE INVENTION

A pressure chamber suitable for containing strands of solid propellant is equipped with igniting means and pressure indicating means. A plurality of separate means for sensing the occurrence of burning, or "burn through," at predetermined increments of length of the propellant sample, is provided so that pressure and burning rates may be correlated.

The pressure indications and instants of burn through are recorded as a graph on a time scale. The volume of the pressure chamber may be adjusted to conform to the requirements of a particular propellant sample and the measuring instruments. The chamber is pressurized by the gasses of combustion.

BRIEF DESCRIPTION OF THE DRAWING

FIG. 1 shows the pressure vessel of the invention.
FIG. 2 shows a strand of propellant with a plurality of embedded "burn through" sensing wires.

DESCRIPTION OF THE PREFERRED EMBODIMENT

Figure 3:
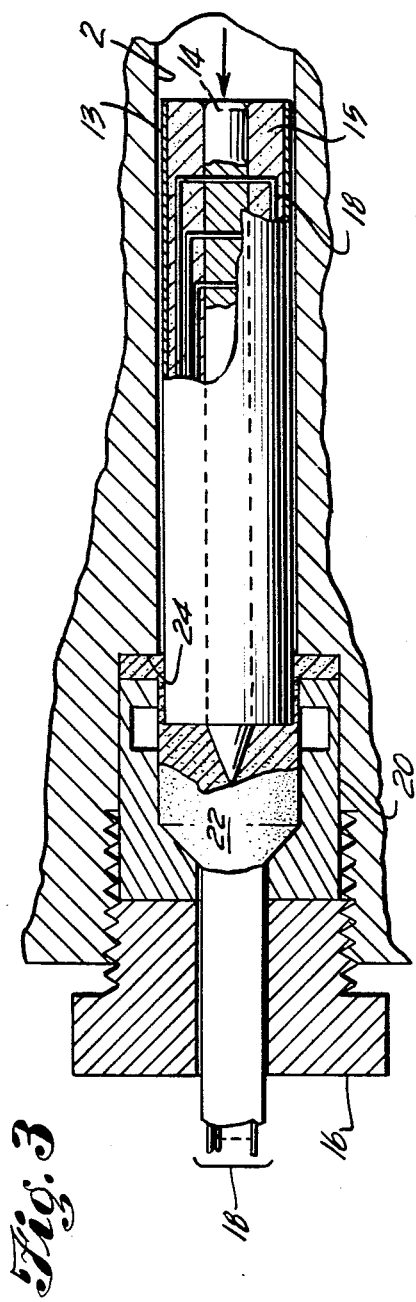
FIG. 3 is a sectional view of the arrangement of propellant and sensing wires.

FIG. 1 shows the pressure vessel of the invention, a "closed bomb." The body is formed of a steel block 1. An opening or chamber 2 is bored through block 1 horizontally. Each end of the horizontal chamber 2 is threaded so that a strand of propellant 14 fixed into an end plug 16 may be threaded into one end of the horizontal opening. A volume adjustment plug 6 may be threaded into the other end of the horizontal chamber 2 a selected distance to adjust the volume of the chamber. The two parts 6a and 6b may be threaded externally and internally respectively so that 6a may be turned into 6b an adjustable depth to additionally modify the volume of 2. Further adjustment may be made by selecting the size and/or shape of plug 6a. Such adjustment might be required depending on the size and nature of the propellant strand under test. A vertical opening 4 is bored into block 1 to receive an igniter 7. Opening 4 communicates with chamber 2 and is threaded to receive a mating thread on igniter 7. A second horizontal opening 8 is bored into block 1 and extends to an intersection with chamber 2. A adapter 10 is fitted into opening 8 to receive a pressure gauge 12 which has an output connection to a recorder 21. 12 may be, for example, a piezoelectric gauge. Propellant strand 14 has a plurality of sensing wires 18 passed through it at selected points along its length as shown in FIG. 2. Propellant strand 14 is potted in a metal support tube 13 using an epoxy plotting compound 15 or equivalent. The potted strand-tube assembly is sealed in end plug 16 which is then inserted in chamber 2 and tightened with the sensing wires 18 lead out through a hole in plug 16 to recorder 21. As best shown in FIG. 3, an end seal 20 containing a sealant 22 is compressed between end plug 16 and a shoulder 24 around opening 2 to obtain a gaslight seal. Volume adjustment plug is inserted in the other end of chamber 2 and may be adjusted to increase or decrease the remaining volume of 2 depending on, for example, the size and type of propellant strand 14, the limitations of age 12, etc. Igniter 7 is inserted in hole 4.

Figure 4:
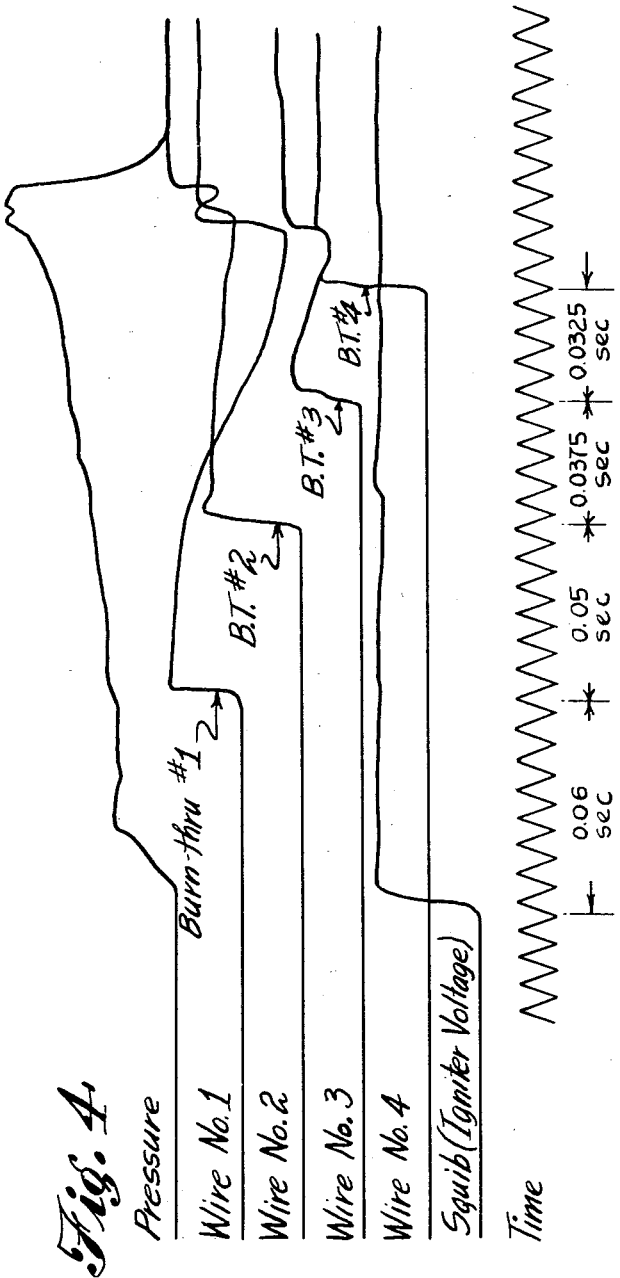
FIG. 4 shows the results of a typical burning rate test.

When igniter 7 is operated to ignite propellant 14 from the right end, combustion gasses will build up pressure in chamber 2, gauge 12 will indicate the buildup of pressure, and sensing means attached to wires 18 will indicate when each sensing wire is burned through by the moving flame front in propellant 14. The epoxy plotting compound 15 and tube 13 prevent flame travel along the sides of propellant strand 14 and thus protect the portions of sensing wires 18 which are not embedded in strand 14 from premature burn through. Since strand 14 must burn progressively from the ignited end, a linear burning rate is obtained. In practice tube 13 may be made of a metal such as copper or aluminum. When the pressure and sensing wire burn throughs are recorded against time in the recorder 21, a graph such as that of FIG. 4 may result. In FIG. 4 the top curve indicates the buildup of pressure in the test chamber 2 over a simultaneously recorded length of time represented by the triangular waveform of the lowermost curve. The intermediate curves with sharp vertical sections indicate the instant when burn though of a particular sensing wire occurs, except for the next-to-the-lowest curve which represents the "squib" or igniting voltage.

In one typical propellant burning rate test, propellant grain 14 was about 1½ inches long with a diameter of 0.11 inches. Holes 0.008 inches diameter were drilled 0.2 inches apart at selected locations along the length of the propellant for inserting the sensing wires 18. Wires 18 are insulated conductors with a diameter of 0.005 inches.

As shown in the curves of FIG. 4, burning rates may be readily correlated with pressure by use of the invention. Other parameters, e.g., temperature, could be readily measured and correlated with time, if desired.

One of the chief advantages of the invention is that it enables the obtaining of burning rate data under much higher pressures than prior art devices. This is particularly useful in testing solid rocket fuels. Additionally, the test results are more accurate since the propellant is burned in an atmosphere of its own gasses, as is usual in rocket motors. Further, the propellant grain size and shape and the chamber interior and exterior size and shape may be readily modified to simulate the configuration, loading density, and heat transfer characteristics of an actual rocket motor. Further, by adding a nozzle or vent, the erosive burning and other flow effects occurring in a rocket motor may be readily simulated. Further, the data may be accumulated more economically than in prior art burning rate measuring devices because many data points are obtained with each firing.

Obviously many modifications and variations of the present invention are possible in the light of the above teachings. It is therefore to be understood that within the scope of the appended claims the invention may be practiced otherwise as specifically described.

We claim:

1. In a device for measuring burning rates, the improvement comprising:
    a pressure chamber for containing a sample material,
    an end plug adapted to be screwed into one end of said chamber for sealing said chamber,
    an adjustable plug adapted to be screwed into one end of said chamber for adjusting the volume thereof,
    igniter means protruding into said chamber for igniting said sample material,
    pressure-measuring means extending into said chamber for measuring the pressure during the burning of a sample material,
    recording means,
    sensing wires connected to said recording means and extending into said chamber, said wires being adapted to be embedded in respective selected parts of said sample material whereby a signal may be forwarded to said recording means when a sensing wire in a selected part of said sample is burned,
    said recording means including pressure and time recording means for providing data for the calculation of burning rates, a metal support tube within said chamber and concentric therewith, a layer of epoxy potting compound interposed between said metal support tube and said sample material to prevent flame travel along the outside of said sample material an to confine the burning thereof to selected parts, parts of said sensing wires extending from said selected parts of said sample material being embedded in said epoxy potting compound to prevent premature burn-through of said wires, the strength of said support tube and the sealing characteristics of said epoxy potting compound being such that flame travel is prevented and the burning of said sample material is progressive and at a linear rate.